US012609105B2

(12) United States Patent     (10) Patent No.:   US 12,609,105 B2

Abid et al.     (45) Date of Patent:    Apr. 21, 2026

(54) ABBREVIATION CLASSIFICATION FOR SPEECH SYNTHESIS AND RECOGNITION

(71) Applicant: Cisco Technology, Inc., San Jose, CA (US)

(72) Inventors: Mohamed Malek Abid, Waterloo (CA); Erwan Barry Tarik Zerhouni, Zürich (CH)

(73) Assignee: CISCO TECHNOLOGY, INC., San Jose, CA (US)

( * ) Notice: Subject to any disclaimer, the term of this patent is extended or adjusted under 35 U.S.C. 154(b) by 596 days.

(21) Appl. No.: 17/977,786

(22) Filed: Oct. 31, 2022

(65) Prior Publication Data

US 2024/0144911 A1     May 2, 2024

(51) Int. Cl.
| | |
|---|---|
| *G10L 13/08* | (2013.01) |
| *G10L 13/047* | (2013.01) |
| *G10L 13/07* | (2013.01) |
| *G10L 15/06* | (2013.01) |
| *G10L 15/187* | (2013.01) |

(52) U.S. Cl.
CPC ............ *G10L 13/08* (2013.01); *G10L 13/047* (2013.01); *G10L 13/07* (2013.01); *G10L 15/063* (2013.01); *G10L 15/187* (2013.01); *G10L 2015/0635* (2013.01)

(58) Field of Classification Search
None
See application file for complete search history.

(56) References Cited

U.S. PATENT DOCUMENTS

| | | |
|---|---|---|
| 2005/0267757 A1 | 12/2005 | Iso-Sipila et al. |
| 2008/0033714 A1 | 2/2008 | Gupta |
| 2011/0093259 A1* | 4/2011 | Saffer ..................... G10L 15/06 |
| | | 704/E11.001 |
| 2013/0144874 A1 | 6/2013 | Koperda et al. |
| 2013/0246047 A1 | 9/2013 | Vassilieva et al. |
| 2020/0357390 A1* | 11/2020 | Bromand ................ G10L 13/00 |
| 2024/0119942 A1* | 4/2024 | Glackin .................. G10L 17/04 |

FOREIGN PATENT DOCUMENTS

CN     103778142 A     5/2014

OTHER PUBLICATIONS

Miranda, et al., "Recovery of Acronyms, Out-of-Lattice Words and Pronunciations From Parallel Multilingual Speech," https://www.cs.cmu.edu/~awb/papers/slt2012/slt2012_parallel_ml_speech.pdf, Nov. 2021, 6 pages.

(Continued)

*Primary Examiner* — Antim G Shah

(74) *Attorney, Agent, or Firm* — Edell, Shapiro & Finnan, LLC

(57) ABSTRACT

A method, computer system, and computer program product are provided for synthesizing and/or recognizing speech. Training data is provided to a machine learning model, wherein the training data comprises a plurality of labeled examples of acronyms and initialisms. The machine learning model is trained to classify strings into an acronym class or an initialism class. An input string is classified with the machine learning model into the acronym class or the initialism class. Based on the classifying, a pronunciation is generated for the input string.

20 Claims, 5 Drawing Sheets

(56) References Cited

OTHER PUBLICATIONS

Nadeau, et al., "A Supervised Learning Approach to Acronym Identification," Conference of the Canadian Society for Computational Studies of Intelligence, Canadian AI 2005: Advances in Artificial Intelligence, May 2005, 12 pages.

Dannells, "Automatic Acronym Recognition," https://aclanthology.org/E06-2021.pdf, Mar. 2006, 4 pages.

Proofed, "Acronyms vs. Initialisms: What's the Difference?," https://proofed.com/writing-tips/acronyms-vs-Initialisms-whats-the-difference/, Apr. 2022, 3 pages.

* cited by examiner

ABBREVIATION CLASSIFICATION FOR SPEECH SYNTHESIS AND RECOGNITION

TECHNICAL FIELD

The present disclosure relates to machine learning-based classification of abbreviations for speech synthesis and recognition.

BACKGROUND

In the field of speech synthesis, there have been many technological advances that enable computer systems to artificially produce human speech. Speech can be generated in a variety of manners, such as by concatenating examples of recorded speech or by developing a synthetic vocal tract model. The quality of synthesized speech may be judged by its similarity to the human voice and the ability to be understood clearly. However, one problem that is commonly encountered by speech synthesis models is an inability to adapt to new or unknown words. Furthermore, in the related field of speech recognition, automatic speech recognition models can have difficulties transcribing new or unknown words.

DETAILED DESCRIPTION

Overview

Figure 1:
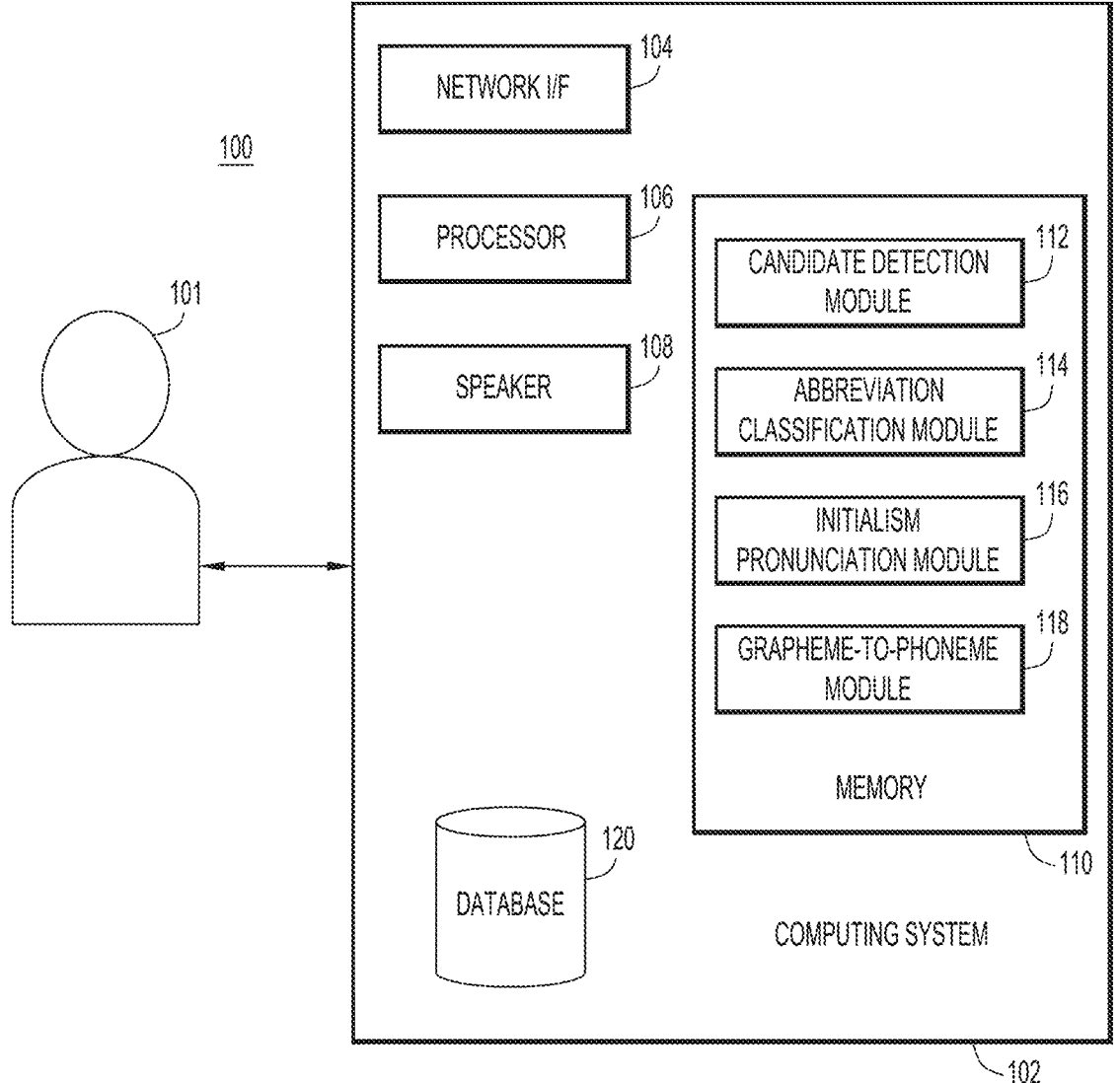
FIG. 1 is a block diagram of a computing environment for synthesizing speech, according to an example embodiment.

According to one embodiment, techniques are provided for generating pronunciations that can be used to synthesize and/or recognize speech. Training data is provided to a machine learning model, wherein the training data comprises a plurality of labeled examples of acronyms and initialisms. The machine learning model is trained to classify strings into an acronym class or an initialism class. An input string is classified with the machine learning model into the acronym class or the initialism class. Based on the classifying, a pronunciation is generated for the input string.

Example Embodiments

In the field of speech synthesis, human speech artificially produced using software and/or hardware-based speech synthesizers that process input text to generate audio of the speech. Typically, text is converted into a phonetic transcription of each word, and phasing, intonation, and/or duration parameters can be adjusted to produce sounds that mimic human speech. A text-to-speech synthesizer may use predetermined sounds that are mapped to sequences of text, or these mappings can be learned via machine learning techniques. In either case, new words that are outside of a known vocabulary set (i.e., "out-of-vocabulary" words) may require additional processing to generate a pronunciation.

Converting initialism and acronyms into speech can be present a challenge to conventional text-to-speech techniques. Acronyms and initialisms are both a string of letters wherein each letter stands for another word; however, initialisms are pronounced by spelling out each letter, whereas acronyms are pronounced as though they are words. Examples of initialisms include "API" ("application programming interface"), "USA" ("United States of America"), and "LED" ("light emitting diode"). In contrast, examples of acronyms include "NASA" (National Aeronautics and Space Administration"), "LAN" ("local area network"), and "JPEG" ("Joint Photographic Experts Group"). Thus, the primary challenge with converting out-of-vocabulary acronyms and initialisms into speech is that there is no indication that a particular string is an acronym or an initialism.

Accordingly, presented herein are techniques for classifying strings of text as either acronyms or initialisms. By training a machine learning model on examples of acronyms and initialisms, a trained model can be applied that can distinguish whether an out-of-vocabulary word is an acronym or an initialism. Next, the string can be processed by an acronym-specific model or an initialism-specific model to generate synthetic speech, and the speech can be added to other speech and presented to a user. The generated pronunciations can also be added to an automatic speech recognition model's lexicon, enabling the automatic speech recognition model to perform speech-to-text processing by using the pronunciation to select corresponding text for a word.

Thus, present embodiments improve the field of speech synthesis by solving a problem that is specific to the field; namely, generating synthetic speech in which both acronyms and initialisms are correctly pronounced. Present embodiments thus improve the realism of synthetic speech, thereby increasing immersion by preventing users from experiencing the jarring impact of obviously-artificial speech. Additionally or alternatively, present embodiments can be used to expand the lexicon of an automatic speech recognition model, thereby adding support for new acronyms and/or initialisms during speech-to-text processing tasks. Moreover, present embodiments may include a machine learning model that is updated based on the outcomes of presenting synthetic speech to users, thereby improving the accuracy of the model (e.g., causing the model to more accurately classify strings as either acronyms or initialisms).

It should be noted that references throughout this specification to features, advantages, or similar language herein do not imply that all of the features and advantages that may be realized with the embodiments disclosed herein should be, or are in, any single embodiment. Rather, language referring to the features and advantages is understood to mean that a specific feature, advantage, or characteristic described in connection with an embodiment is included in at least one embodiment. Thus, discussion of the features, advantages, and similar language, throughout this specification may, but do not necessarily, refer to the same embodiment.

Furthermore, the described features, advantages, and characteristics may be combined in any suitable manner in one or more embodiments. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages will become more fully apparent from the following drawings, description and appended claims, or may be learned by the practice of embodiments as set forth hereinafter.

Embodiments will now be described in detail with reference to the Figures. FIG. 1 is a block diagram of a computing environment 100 for synthesizing speech, according to an example embodiment. As depicted, computing environment 100 includes at least one user 101 and a computing system 102 that includes a network interface (I/F) 104, at least one at least one processor 106, a speaker 108, memory 110, and database 120. Memory 110 stores software instructions for a candidate detection module 112, an abbreviation classification module 114, an initialism pronunciation module 116, and a grapheme-to-phoneme module 118. It is to be understood that the functional division among components of computing environment 100 have been chosen for purposes of explaining various embodiments and is not to be construed as a limiting example. Computing environment 100 may include internal and external hardware components, as depicted and described in further detail with respect to FIG. 5. In general, computing environment 100 synthesizes artificial speech using text inputs in accordance with present embodiments.

In various embodiments, computing system 102 may include a rack-mounted server, laptop, desktop, smartphone, tablet, or any other programmable electronic device capable of executing computer readable program instructions. Network interface 104 enables components of computing system 102 to send and receive data over a network. Speaker 108 may include any audio-producing device (e.g., a transducer that converts signals into sounds), and may be positioned at a location that is suitable to provide audio samples to a user (e.g., user 101). User 101 may interact with computing system 102 to receive audio, including artificial speech that is synthesized using text inputs. In some embodiments, user 101 may provide feedback to computing system 102, such as feedback that indicates whether input text was properly converted into synthetic speech.

Candidate detection module 112, abbreviation classification module 114, initialism pronunciation module 116, and grapheme-to-phoneme module 118 may include one or more modules or units to perform various functions of the embodiments described below. Candidate detection module 112, abbreviation classification module 114, initialism pronunciation module 116, and grapheme-to-phoneme module 118 may be implemented by any combination of any quantity of software and/or hardware modules or units, and may reside within memory 110 of computing environment 100 for execution by a processor, such as processor 106.

Candidate detection module 112 may analyze input text to identify any out-of-vocabulary words that may be abbreviations or initialisms. In some embodiments, candidate detection module 112 detects a candidate for an abbreviation or initialism when the candidate is a string of upper-case characters. Additionally or alternatively, a candidate can be identified based on the presence of punctuation, such as a period following each alphabetical letter in a string (e.g., "U.S.C."). In some embodiments, candidate detection module 112 may cross-reference a candidate against a list of known abbreviations or initialisms to determine whether additional processing should be performed or whether a pronunciation is already known. In some embodiments, candidate detection module 112 may employ a web crawler to search one or more web sites, including search engines, with a query comprising the candidate word to determine whether the candidate word appears in a list of abbreviations. A list of abbreviations can be identified in search query results based on the presence of key words such as "abbreviations," "stands for," and the like which may also be within a threshold number of characters in proximity to the queried candidate.

Abbreviation classification module 114 analyzes candidate words to determine whether each word is either an abbreviation or an initialism. As such, abbreviation classification module 114 may employ one or more classifiers that are trained using machine learning techniques to classify input text into an abbreviation class or an initialism class. Abbreviation classification module 114 may use a machine learning model, such as a character-level long short-term memory (LSTM) model or a transformer model, which is trained using a training set of examples of acronyms and initialisms that are labeled as such. Another set of examples of acronyms and initialisms may be reserved for a testing set so that during training, the model's accuracy can be evaluated using the training set. Thus, a classifier can be trained to a desired level of accuracy.

Once a classifier is trained, abbreviation classification module 114 may be utilized by providing as input one or more candidate words, which abbreviation classification module 114 may classify as either an abbreviation or an initialism. In some embodiments, abbreviation classification module 114 may also provide a confidence score indicating the probability of the candidate word correctly being classified; if the confidence score is below a threshold value, then one or more actions can be performed, such as re-classifying the candidate word using another trained classifier, or requesting human intervention. In some embodiments, a plurality of classifier models may be employed that include different machine learning models and/or are each trained using different training data; each model may be used to classify a candidate word, and if there is a consensus among the models, that classification may be selected. For example, if four out of five models indicate that a candidate word is an abbreviation, then the candidate word will be classified as an abbreviation. When a candidate word is classified as an acronym, abbreviation classification module 114 may provide the classified word to grapheme-to-phoneme module 118. Similarly, when a candidate word is classified as an initialism, abbreviation classification module 114 may provide the classified word to initialism pronunciation module 116.

Initialism pronunciation module 116 may receive a string of text corresponding to an initialism and may convert the initialism into a series of graphemes that are subsequently used to synthesize speech. An input initialism may be divided into each component letter, such as by dividing the initialism "DMZ" into the ordered sequence "D" "M" and "Z". Next, this ordered series of graphemes can be passed to grapheme-to-phoneme module 118 to generate a pronunciation for the initialism. Accordingly, initialism pronunciation module 116 converts an initialism having a string of n characters into a series of graphemes that is also n graphemes in length.

Grapheme-to-phoneme module 118 receives a string of text corresponding to an acronym or an initialism's expanded series of graphemes, and may generate a pronunciation in order to synthesize speech. Grapheme-to-phoneme module 118 may synthesize speech by using one or more models that convert natural language words or letters to audio pronunciations. In the case of an acronym, the acronym is divided into graphemes, which are the smallest functional units within a writing system. For example, the acronym "NASA" may be divided into "n" "aa" "s" "ah,"

and the acronym "LED" may be divided into "eh" "l" "iy" "d" "iy." In the case of an initialism, each letter corresponds to a grapheme, which are provided in an ordered sequence by initialism pronunciation module 116. In either case, an audio pronunciation (i.e., a phoneme) may be selected for each grapheme, and the audio pronunciations may be concatenated to generate an audio pronunciation of the full acronym. Thus, in some embodiments, a pronunciation of an acronym or initialism is generated based on predetermined mappings of graphemes to phonemes. However, in other embodiments, one or more natural language processing models can be trained to generate speech using examples of words or letters and corresponding pronunciations. For example, a generative adversarial network may be trained using training data of text and pronunciations to generate pronunciations for any input text. Thus, grapheme-to-phoneme module 118 may generate pronunciations using a machine learning approach that does not rely upon predefined relationships between text and pronunciations.

Database 120 may include any non-volatile storage media known in the art. For example, database 120 can be implemented with a tape library, optical library, one or more independent hard disk drives, or multiple hard disk drives in a redundant array of independent disks (RAID). Similarly, data in database 120 may conform to any suitable storage architecture known in the art, such as a file, a relational database, an object-oriented database, and/or one or more tables. Database 120 may store data including trained machine learning models, a corpus of words and corresponding pronunciations, associations between graphemes and phonemes, training data, testing data, and the like.

Figure 2:
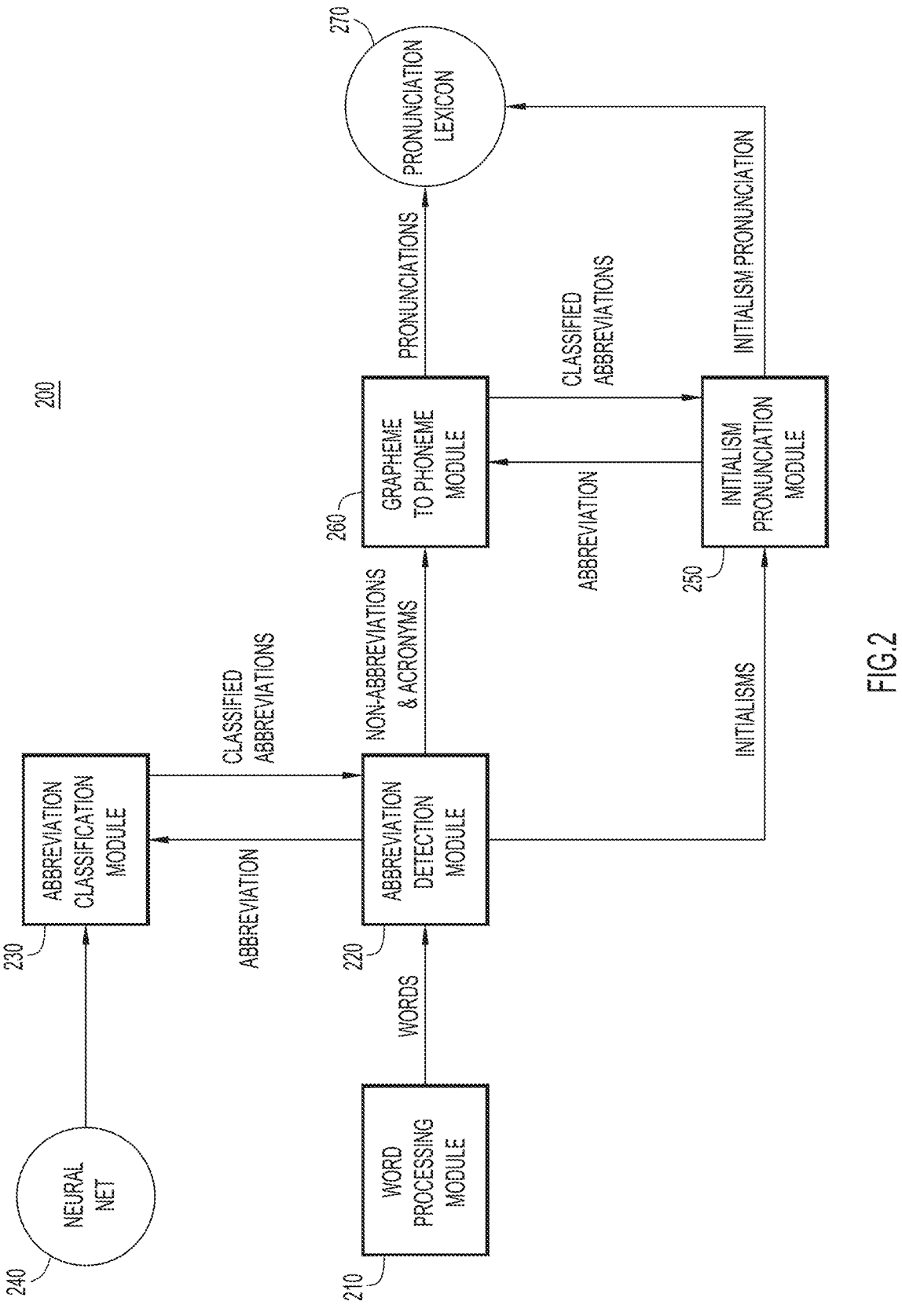
FIG. 2 is a block diagram depicting a workflow for processing out-of-vocabulary words, according to an example embodiment.

Reference is now made to FIG. 2. FIG. 2 is a block diagram depicting a workflow 200 for processing out-of-vocabulary words, according to an example embodiment. As depicted, workflow 200 has several components, including a word processing module 210, an abbreviation detection module 220, an abbreviation classification module 230 (which utilizes a neural net 240), an initialism pronunciation module 250, a grapheme-to-phoneme module 260, and a pronunciation lexicon 270. It should be appreciated that the components of workflow 200 may include combinations of user-defined and/or machine learning modules that can be specific to one language (e.g., English, Spanish, Mandarin, etc.), or multiple languages (e.g., French, Italian, and Portuguese; English and Japanese, etc.).

Initially, word processing module 210 may be provided with input text. A user may provide a sample of text for which the user desires a pronunciation to be generated. The sample of text may include one language or a mixture of languages, and can include out-of-vocabulary words that are not included in pronunciation lexicon 270 (e.g., words not previously encountered or defined). Word processing module 210 may perform various pre-processing tasks on input text, such as correcting spelling, sanitizing data, and the like. Next, word processing module 210 provides the text to abbreviation detection module 220 to detect any abbreviations and/or initialisms in the text. In some embodiments, word processing module 210 may only provide text to abbreviation detection module 220 that is not already included in pronunciation lexicon 270.

Abbreviation detection module 220 may parse samples of text to identify any abbreviations or initialisms that are included in the text. In some embodiments, abbreviation detection module 220 corresponds to candidate detection module 112, which is depicted and described in further detail with reference to FIG. 1. In workflow 200, abbreviation detection module 220 may detect that a string of text is a candidate for being either an abbreviation or an initialism when the string of text includes multiple capital letters and/or punctuation (e.g., periods). Each candidate may be extracted and passed to abbreviation classification module 230 for further processing.

Abbreviation classification module 230 may determine whether a candidate word is either an abbreviation or an initialism using one or more trained machine learning models, such as neural net 240. In some embodiments, abbreviation classification module 230 corresponds to abbreviation classification module 114, which is depicted and described in further detail with reference to FIG. 1. In particular, neural net 240 can be trained using a training set of labeled examples of initialisms and acronyms. When neural net 240 attains a desired level of accuracy, training may be completed, and abbreviation classification module 230 can classify input candidates as either abbreviations or initialisms. The results of classifying a candidate may be provided to initialism pronunciation module 250 in the case of initialisms, and grapheme-to-phoneme module 260 in the case of abbreviations.

Initialisms may be provided to initialism pronunciation module 250, which may correspond to initialism pronunciation module 116 that is depicted and described in further detail with reference to FIG. 1. Initialism pronunciation module 250 may expand an initialism into an ordered series of graphemes for additional processing. In general, an initialism can be converted to graphemes by separating each letter of the initialism in order. For example, the initialism "UTV" may be converted to "yoo" "tee" "vee." The ordered sequence of graphemes can then be provided to grapheme-to-phoneme module 260 to generate pronunciations.

Graphemes may be provided to grapheme-to-phoneme module 260, which may correspond to grapheme-to-phoneme module 118 that is depicted and described in further detail with reference to FIG. 1. Grapheme-to-phoneme module 260 may convert graphemes to phonemes by converting a word into graphemes (in the case of an abbreviation) or directly using an ordered sequence of graphemes generated by initialism pronunciation module 250. In some embodiments, each grapheme is mapped to a corresponding phoneme in a predetermined manner. In other embodiments, a machine learning model may be employed to learn correlations between graphemes and phonemes (e.g., using a training corpus of examples of phonemes that are labeled with their corresponding graphemes). The resulting phonemes are concatenated together into a full word, which can be added to pronunciation lexicon 270. Thus, grapheme-to-phoneme module 260 may convert non-candidate words into pronunciations directly, as well as converting abbreviations and ordered sequences of phonemes to pronunciations. In some embodiments, grapheme-to-phoneme module 260 may perform additional processing to words or sentences to modify the cadence, tone, accent, and the like in order to generate synthetic speech that sounds authentic to a listener.

Pronunciation lexicon 270 may include a database of words (including initialisms and abbreviations) and their corresponding audio pronunciations. Pronunciation lexicon 270 can be cross-referenced by other components of workflow 200 (e.g., word processing module 210) in order to determine whether a word already has a pronunciation. Thus, words whose pronunciations are already known may be omitted from further processing in order to conserve computing resources.

Figure 3:
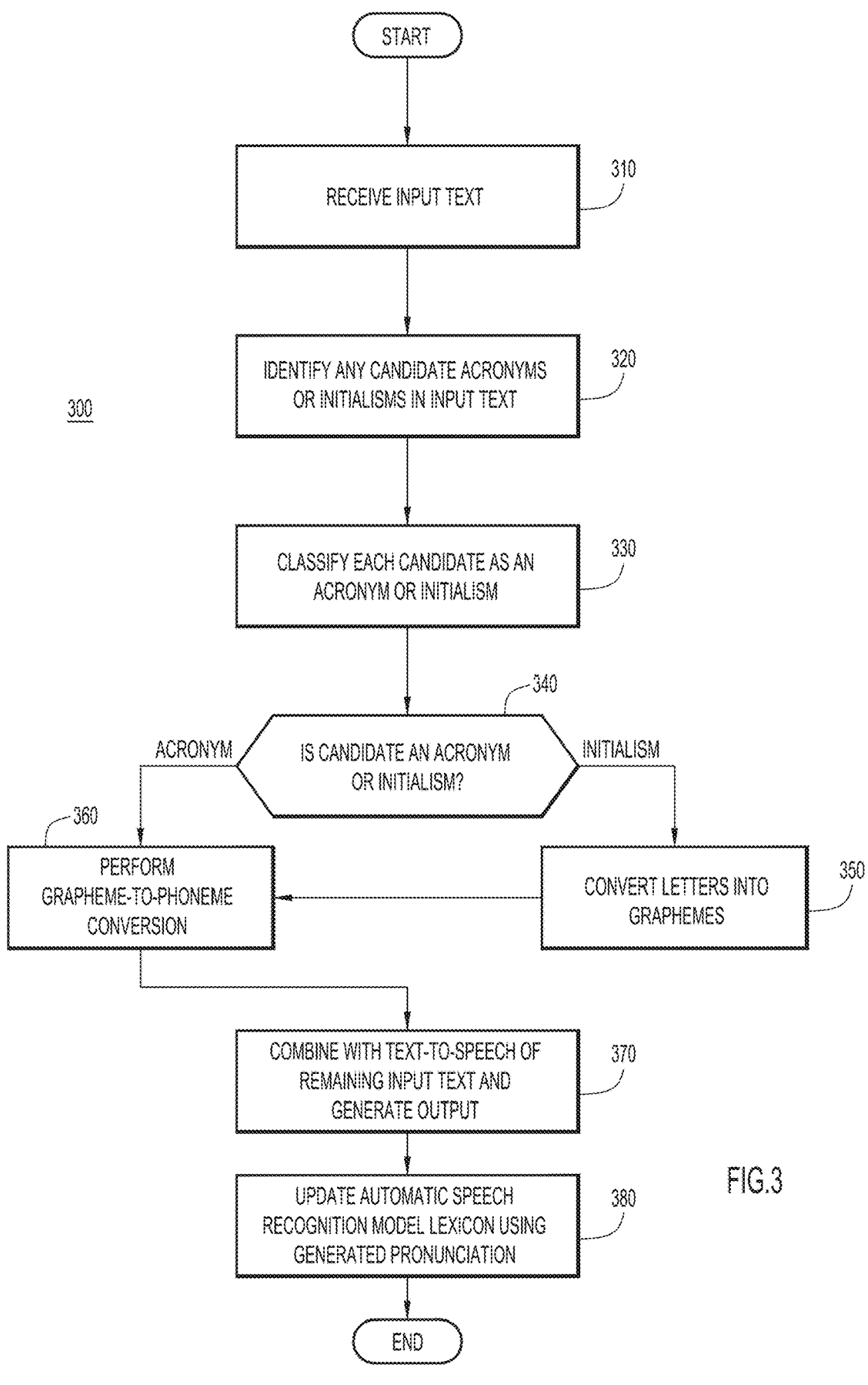
FIG. 3 is a flow chart of a method of synthesizing speech and updating an automatic speech recognition model, according to an example embodiment.

FIG. 3 is a flow chart of a method 300 of synthesizing speech, according to an example embodiment.

Input text is received at operation 310. The input text may be provided by a local user, received via a network, and the like, and can include words or sentences for which an audio pronunciation is desired. Thus, the input text may correspond to a text-to-speech job. The input text may include one or more languages, and can be provided in toto or can be streamed to a computing device (e.g., computing system 102).

Any candidate acronyms or initialisms are identified in the input text at operation 320. The input text can be parsed for any candidate acronyms or initialisms, which may be identifiable based on the presence of upper-case letters and/or punctuation (e.g., periods). Each candidate acronym or initialism may be extracted from the input text and provided to a classifier for additional processing.

Each candidate is classified as an acronym or an initialism at operation 330. A machine learning classifier is trained to classify strings of text into either an acronym class or an initialism class using labeled examples of acronyms and initialisms. The classifier may include a neural network, such as an LSTM classifier or a transformer, or another form of classifier. Once a candidate is classified as an acronym or an initialism, the candidate may be processed accordingly to generate a pronunciation.

Operation 340 determines whether a candidate is an acronym or an initialism. If the candidate is an initialism, then letters of an initialism are converted into graphemes at operation 350. Each letter of the alphabet may be mapped to a corresponding grapheme, thus enabling an initialism to be converted into an ordered sequence of graphemes based on the ordered letters of the initialism. If the candidate is an acronym, grapheme-to-phoneme conversion may be directly performed at operation 360.

Grapheme-to-phoneme conversion is performed at operation 360. An acronym may first be broken down into its constituent graphemes using a predetermined mapping of letter sequences to graphemes. In the case of an initialism, the graphemes are provided from operation 340. Once the graphemes are obtained, the graphemes may be converted to phonemes using a mapping of graphemes to phonemes, which can include audio samples of each phoneme. The resulting phonemes can then be concatenated to generate a full audio pronunciation of a word. In some embodiments, rather than using mappings of graphemes to phonemes, pronunciations may be generated using a machine learning model, such as generative adversarial network, which is trained using samples of text and corresponding pronunciations to generate new pronunciations.

The resulting pronunciations are combined with the text-to-speech results of the remaining input text to generate output at operation 370. Thus, pronunciations of acronyms and initialisms can be inserted into a sequence of pronunciations for the other words of the input text to generate a full sequence of audio that correctly pronounces the words of the input text. This audio may be played via a speaker to one or more listeners, who may hear and understand the audio and perform actions accordingly.

An automatic speech recognition model's lexicon is updated using the generated pronunciation at operation 380. The automatic speech recognition model may include a statistical model, natural language processing model, or other machine learning model that utilizes a lexicon of examples of pronunciations of words in order to convert audio input to textual words (e.g., speech-to-text conversion). In order to update a lexicon, a mapping of a pronunciation (e.g., an audio pronunciation) to a text string (e.g., a natural language word, acronym, and/or initialism) can be added. Thus, any automatic speech recognition model's lexicon can be extended to include support for any acronym or initialism, including both new and unknown strings, in accordance with present embodiments. An automatic speech recognition model may accordingly be employed for speech-to-text processing using an updated lexicon.

Figure 4:
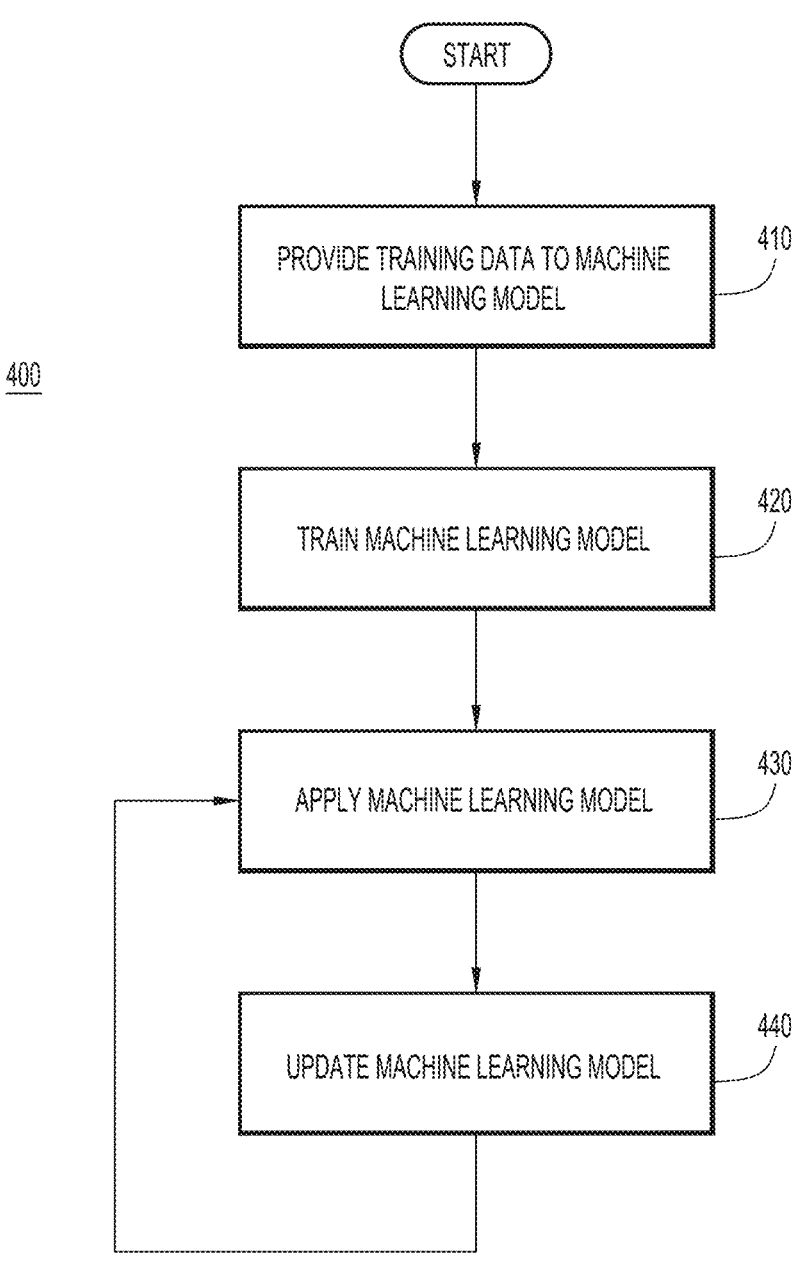
FIG. 4 is a flow chart of a method of training and updating a machine learning model used in the presented techniques, according to an example embodiment.

FIG. 4 is a flow chart of a method 400 of training and updating a machine learning model used in the presented techniques, according to an example embodiment.

Training data is provided to the machine learning model at operation 410. The machine learning model may include a neural network or other model; in some embodiments, the machine learning model is an LSTM-based model or a transformer-based model. The training data may include strings of text that are examples of initialisms and abbreviations. Each string of text may be labeled according to whether the string of text is an initialism or an abbreviation so that the model can learn to classify input text into either an initialism class or an abbreviation class.

The machine learning model is trained at operation 420. Once the machine learning model has achieved a desired level of accuracy at classifying initialisms and abbreviations, training may be stopped, and the machine learning model can be applied at operation 430. In applying the machine learning model, candidate words can be provided, and the model can classify each candidate word as either an acronym or an initialism. The output classifications can be used to speech synthesis and optionally presented to one or more users. A user can provide feedback upon reviewing the results to indicate whether the word was correctly or incorrectly classified, and the feedback can be gathered in order to provide additional training data for updating the machine learning model.

The machine learning model is updated at operation 440. Using the feedback collected from users, a neural network can be updated in order to strengthen correct classifications and down-rank incorrect classifications. Thus, as the model is used over time, and user feedback is corrected, the accuracy of the model may be increased through additional training.

Figure 5:
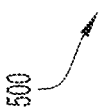
FIG. 5 is a block diagram of a device that may be configured to provide speech feedback, as presented herein.

Referring now to FIG. 5, a block diagram is shown of a computing device 500 that may perform functions associated with the techniques discussed herein in connection with FIGS. 1-4.

In at least one embodiment, the computing device 500 may include one or more processor(s) 502, one or more memory element(s) 504, storage 506, a bus 508, one or more network processor unit(s) 510 interconnected with one or more network input/output (I/O) interface(s) 512, one or more I/O 514, and 520. In various embodiments, instructions associated with logic for computing device 500 can overlap in any manner and are not limited to the specific allocation of instructions and/or operations described herein.

In at least one embodiment, processor(s) 502 is/are at least one hardware processor configured to execute various tasks, operations and/or functions for computing device 500 as described herein according to software and/or instructions configured for computing device 500. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 504 and/or storage 506 is/are configured to store data, information, software, and/or instructions associated with computing device 500, and/or logic configured for memory element(s) 504 and/or storage 506. For example, any logic described herein (e.g., 520) can, in various embodiments, be stored for computing device 500 using any combination of memory element(s) 504 and/or storage 506. Note that in some embodiments, storage 506 can be consolidated with memory element(s) 504 (or vice versa), or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 510 may enable communication between computing device 500 and other systems, entities, etc., via network I/O interface(s) 512 (wired and/or wireless) to facilitate operations discussed for various embodiments described herein. In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 512 can be configured as one or more Ethernet port(s), Fibre Channel ports, any other I/O port(s), and/or antenna(s)/antenna array(s) now known or hereafter developed. Thus, the network processor unit(s) 510 and/or network I/O interface(s) 512 may include suitable interfaces for receiving, transmitting, and/or otherwise communicating data and/or information in a network environment.

I/O 514 allow for input and output of data and/or information with other entities that may be connected to computing device 500. For example, I/O 514 may provide a connection to external devices such as a keyboard, keypad, mouse, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., 520) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 504 and/or storage 506 can store data, software, code, instructions (e.g., processor instructions), logic, parameters, combinations thereof, and/or the like used for operations described herein. This includes memory element(s) 504 and/or storage 506 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 502.11 (e.g., Wi-Fi®/Wi-Fi6®), IEEE 502.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In some aspects, the techniques described herein relate to a computer-implemented method including: providing training data to a machine learning model, wherein the training data includes a plurality of labeled examples of acronyms and initialisms; training the machine learning model to classify strings into an acronym class or an initialism class; classifying, with the machine learning model, an input string into the acronym class or the initialism class; and based on the classifying, generating a pronunciation for the input string.

In some aspects, the techniques described herein relate to a computer-implemented method, further including: updating a lexicon of an automatic speech recognition model using the generated pronunciation; and employing the automatic speech recognition model to perform speech-to-text conversion processing.

In some aspects, the techniques described herein relate to a computer-implemented method, wherein the pronunciation includes an audio pronunciation generated using a text-to-speech conversion model.

In some aspects, the techniques described herein relate to a computer-implemented method, further including: adding the pronunciation to a dictionary that includes other pronunciations of words; and using the dictionary to perform text-to-speech conversion processing.

In some aspects, the techniques described herein relate to a computer-implemented method, further including: collecting user feedback based on results of classifying the input string; and updating the machine learning model based on the user feedback.

In some aspects, the techniques described herein relate to a computer-implemented method, wherein generating the pronunciation for the input string that is classified into the acronym class includes performing grapheme-to-phoneme conversion.

In some aspects, the techniques described herein relate to a computer-implemented method, wherein generating the pronunciation for the input string that is classified into the initialism class includes converting each letter of the input string into one or more phonemes.

In some aspects, the techniques described herein relate to a computer system including: one or more computer processors; one or more computer readable storage media; and program instructions stored on the one or more computer readable storage media for execution by at least one of the one or more computer processors, the program instructions including instructions to: provide training data to a machine learning model, wherein the training data includes a plurality of labeled examples of acronyms and initialisms; train the machine learning model to classify strings into an acronym class or an initialism class; classify, with the machine learning model, an input string into the acronym class or the initialism class; and based on classification by the machine learning model, generate a pronunciation for the input string.

In some aspects, the techniques described herein relate to a computer system, wherein the program instructions further include instructions to: update a lexicon of an automatic speech recognition model using the generated pronunciation; and employ the automatic speech recognition model to perform speech-to-text conversion processing.

In some aspects, the techniques described herein relate to a computer system, wherein the pronunciation includes an audio pronunciation generated using a text-to-speech conversion model.

In some aspects, the techniques described herein relate to a computer system, wherein the program instructions further include instructions to: add the pronunciation to a dictionary that includes other pronunciations of words; and use the dictionary to perform text-to-speech conversion processing.

In some aspects, the techniques described herein relate to a computer system, wherein the program instructions further include instructions to: collect user feedback based on results of classifying the input string; and update the machine learning model based on the user feedback.

In some aspects, the techniques described herein relate to a computer system, wherein generating the pronunciation for input string that is classified into the acronym class includes performing grapheme-to-phoneme conversion.

In some aspects, the techniques described herein relate to a computer system, wherein generating the pronunciation for input string that is classified into the initialism class includes converting each letter of the input string into one or more phonemes.

In some aspects, the techniques described herein relate to a computer program product including one or more computer readable storage media collectively having program instructions embodied therewith, the program instructions executable by a computer to cause the computer to perform operations including: providing training data to a machine learning model, wherein the training data includes a plurality of labeled examples of acronyms and initialisms; training the machine learning model to classify strings into an acronym class or an initialism class; classifying, with the machine learning model, an input string into the acronym class or the initialism class; and based on the classifying, generating a pronunciation for the input string.

In some aspects, the techniques described herein relate to a computer program product, wherein the program instructions further cause the computer to: update a lexicon of an automatic speech recognition model using the generated pronunciation; and employ the automatic speech recognition model to perform speech-to-text conversion processing.

In some aspects, the techniques described herein relate to a computer program product, wherein the pronunciation includes an audio pronunciation generated using a text-to-speech conversion model.

In some aspects, the techniques described herein relate to a computer program product, wherein the program instructions further cause the computer to perform operations including: adding the pronunciation to a dictionary that includes other pronunciations of words; and using the dictionary to perform text-to-speech conversion processing.

In some aspects, the techniques described herein relate to a computer program product, wherein generating the pronunciation for the input string that is classified into the acronym class includes performing grapheme-to-phoneme conversion.

In some aspects, the techniques described herein relate to a computer program product, wherein generating the pronunciation for the input string that is classified into the initialism class includes converting each letter of the input string into one or more phonemes.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A computer-implemented method comprising:

training a machine learning model to classify strings into an acronym class or an initialism class;

classifying, with the machine learning model, an input string of an input text provided by a user into the acronym class or the initialism class, wherein the input text comprises the input string and one or more additional strings;

providing a confidence score indicating a probability of the input string being correctly classified into the acronym class or the initialism class;

converting, based on the classifying, a plurality of graphemes of the input string into a plurality of phonemes; and combining one or more audio samples of the plurality of phonemes with a pronunciation for the one or more additional strings to generate a synthesized pronunciation for the input text.

2. The computer-implemented method of claim 1, further comprising:

updating a lexicon of an automatic speech recognition model using the synthesized pronunciation; and employing the automatic speech recognition model to perform speech-to-text conversion processing.

3. The computer-implemented method of claim 1, wherein the synthesized pronunciation comprises an audio pronunciation generated using a text-to-speech conversion model.

4. The computer-implemented method of claim 1, further comprising:

adding the synthesized pronunciation to a dictionary that includes other pronunciations of words; and using the dictionary to perform text-to-speech conversion processing.

5. The computer-implemented method of claim 1, further comprising:

collecting user feedback based on results of classifying the input string; and updating the machine learning model based on the user feedback.

6. The computer-implemented method of claim 1, wherein converting, based on the classifying, the plurality of graphemes of the input string into the plurality of phonemes includes using a natural language processing model to perform grapheme-to-phoneme conversion for the input string that is classified into the acronym class.

7. The computer-implemented method of claim 1, wherein converting, based on the classifying, the plurality of graphemes of the input string into the plurality of phonemes includes converting a grapheme of each letter of the input string that is classified into the initialism class into one or more phonemes.

8. The computer-implemented method of claim 1, wherein the machine learning model is a long short-term memory model or a transformer model.

9. The computer-implemented method of claim 1, wherein training the machine learning model to classify the strings into the acronym class or the initialism class includes training the machine learning model based on a plurality of labeled examples.

10. A computer system comprising:

one or more computer processors;

one or more computer readable storage media; and program instructions stored on the one or more computer readable storage media for execution by at least one of the one or more computer processors, the program instructions comprising instructions to:

train a machine learning model to classify strings into an acronym class or an initialism class;

classify, with the machine learning model, an input string of an input text provided by a user into the acronym class or the initialism class, wherein the input text comprises the input string and one or more additional strings;

provide a confidence score indicating a probability of the input string being correctly classified into the acronym class or the initialism class;

convert, based on the classifying, a plurality of graphemes of the input string into a plurality of phonemes; and combine one or more audio samples of the plurality of phonemes with a pronunciation for the one or more additional strings to generate a synthesized pronunciation for the input text.

11. The computer system of claim 10, wherein the program instructions further comprise instructions to:

update a lexicon of an automatic speech recognition model using the synthesized pronunciation; and employ the automatic speech recognition model to perform speech-to-text conversion processing.

12. The computer system of claim 10, wherein the synthesized pronunciation comprises an audio pronunciation generated using a text-to-speech conversion model.

13. The computer system of claim 10, wherein the program instructions further comprise instructions to:

add the synthesized pronunciation to a dictionary that includes other pronunciations of words; and use the dictionary to perform text-to-speech conversion processing.

14. The computer system of claim 10, wherein the program instructions further comprise instructions to:

collect user feedback based on results of classifying the input string; and update the machine learning model based on the user feedback.

15. The computer system of claim 10, wherein converting, based on the classifying, the plurality of graphemes of the input string into the plurality of phonemes includes using a natural language processing model to perform grapheme-to-phoneme conversion for the input string that is classified into the acronym class.

16. The computer system of claim 10, wherein converting, based on the classifying, the plurality of graphemes of the input string into the plurality of phonemes includes converting a grapheme of each letter of the input string that is classified into the initialism class into one or more phonemes.

17. A non-transitory computer program product comprising one or more computer readable storage media collectively having program instructions embodied therewith, the program instructions executable by a computer to cause the computer to perform operations including:

training a machine learning model to classify strings into an acronym class or an initialism class;

classifying, with the machine learning model, an input string of an input text provided by a user into the acronym class or the initialism class, wherein the input text comprises the input string and one or more additional strings;

providing a confidence score indicating a probability of the input string being correctly classified into the acronym class or the initialism class;

converting, based on the classifying, a plurality of graphemes of the input string into a plurality of phonemes; and combining one or more audio samples of the plurality of phonemes with a pronunciation for the one or more additional strings to generate a synthesized pronunciation for the input text.

18. The non-transitory computer program product of claim 17, wherein the program instructions further cause the computer to:

update a lexicon of an automatic speech recognition model using the synthesized pronunciation; and employ the automatic speech recognition model to perform speech-to-text conversion processing.

19. The non-transitory computer program product of claim 17, wherein converting, based on the classifying, the plurality of graphemes of the input string into the plurality of phonemes includes using a natural language processing model to perform grapheme-to-phoneme conversion for the input string that is classified into the acronym class.

20. The non-transitory computer program product of claim 17, wherein converting, based on the classifying, the plurality of graphemes of the input string into the plurality of phonemes includes converting a grapheme of each letter of the input string that is classified into the initialism class into one or more phonemes.

\* \* \* \* \*